United States Patent [19]

Buchbinder

[11] 4,076,569

[45] Feb. 28, 1978

[54] PROCESS FOR UPGRADING PLYWOOD PANELS

[76] Inventor: Arnold Buchbinder, 10331 Almayo, Los Angeles, Calif. 90064

[21] Appl. No.: 676,698

[22] Filed: Apr. 14, 1976

[51] Int. Cl.[2] .......................... B05D 7/06; B05D 3/12; B29D 7/02

[52] U.S. Cl. ...................................... 156/242; 427/358

[58] Field of Search ........................ 427/358, 359, 393; 156/242, 244; 428/479

[56] References Cited

U.S. PATENT DOCUMENTS

| | | | |
|---|---|---|---|
| 2,770,556 | 11/1956 | Grangaard et al. | 117/2 |
| 2,860,597 | 11/1958 | Works et al. | 118/413 |
| 2,863,364 | 12/1958 | Rosenquist et al. | 92/40 |
| 2,977,242 | 3/1961 | Lederman et al. | 117/64 |
| 3,098,053 | 7/1963 | Hallonquist | 260/31.2 |
| 3,457,094 | 7/1969 | Elmendorf et al. | 117/2 |
| 3,467,538 | 9/1969 | Best | 117/8 |
| 3,478,791 | 11/1969 | Elmendorf | 144/310 |
| 3,632,372 | 1/1972 | Heslop et al. | 428/479 X |
| 3,844,863 | 10/1974 | Forsythe et al. | 156/98 |

*Primary Examiner*—James R. Hoffman

*Attorney, Agent, or Firm*—Klarquist, Sparkman, Campbell, Leigh, Hall & Whinston

[57] ABSTRACT

A method and apparatus for applying a coating of thermoplastic resin to the surface of low grade plywood panels so as to form smooth surface suitable for use in concrete forms or the like is described. Polyamides or like resins are applied to the surface of a panel and the panel passed beneath an extruder or doctor blade provided with upwardly inclined surface that accumulates a puddle of resin on the upstream side of the extruder blade. The panel leaves the extruder with a coating of resin which fills knot holes and other surface defects. The coated panel is passed through an oven heating only the top side of the panel thereby allowing a bottom portion of the resin layer which is nearest the wood to solidify while a top portion remains liquid. The panel may then either be covered with a layer of paper and compressed between nip rollers or passed beneath a smoothing device, such as a reverse wiping roll or a doctor blade, to smooth the upper portion of the resin layer. Paper covered panels to be used in concrete forming may be saturated with an appropriate release agent.

18 Claims, 4 Drawing Figures

PROCESS FOR UPGRADING PLYWOOD PANELS

BACKGROUND OF THE INVENTION

Because of numerous desirable features such as lightness, high strength to weight ratio, and relatively low cost, plywood panels have long been used for structural purposes such as forms in casting concrete structures and as siding or paneling. However, plywood panels for such purposes have had to be prepared with a high grade veneer surface which is defect free. Panels used in poured concrete forming require smooth surfaces, since any surface irregularities will appear on the surface of the concrete. Moreover, raw wood panels used in the forming of concrete absorb moisture and as a result undergo surface deterioration and even buckling or warpage so that their useful life is lessened. Panels intended for use as siding requires a surface which is weather resistant. This surface is traditionally achieved by painting. The raw wood surface of panels is highly absorbent, however, so that a large quantity of paint must be applied before a suitable surface finish is obtained and such surface is still subject to checking.

In the past, attempts have been made to overcome these disadvantages. Such attempts include providing the panel with a resin impregnated surface layer of kraft paper or otherwise providing a plastic resin surface on panels. Despite these attempts, none of the prior processes has been wholly successful in providing a protective surface on plywood panels which have surface defects. Each of the prior processes and resulting panels suffer from one or more disadvantages.

A variety of the prior panel surfacing methods employ thermosetting resins to fill cracks and fissures in the panel surface. Thermosetting resins are difficult to use because they set up with heat and are no longer workable as a liquid thereafter. Moreover, a thermosetting resin layer shrinks and changes shape as it sets. Thus, a layer of thermosetting resin thicker than is actually desired in the final product must be applied to allow for the shrinkage. Also, it is necessary to use mechanical finishing procedures, such as sanding, to obtain a smooth surface after a thermosetting resin is solidified by the application of heat. Any excess thermosetting resin removed from a panel surface during such a finishing procedure is an unusable waste product.

SUMMARY OF THE INVENTION

It is an object of the present invention to provide a new and improved panel suitable for use for concrete forming.

It is a further object of the invention to provide a new and improved method and apparatus for providing plywood panels with a smooth resin coating that will permit such panels to be used for the casting of concrete and for other purposes where a smooth, oil or moisture resistant surface is required.

A further object is to provide a new and improved process for producing weather resistant, paint grade plywood panels.

Another object of the invention is to provide a new and improved method and apparatus capable of forming smooth, planar thermoplastic coatings on plywood panels having surface veneers with substantial defects therein.

In accordance with the invention, panels of cellulosic material, such as plywood panels, having surface defects such as cracks, knot holes and the like are fed along a horizontal path and beneath a resin applicator which applies liquid thermoplastic resin to the surface of the panels. While the resin is still liquid, each panel is passed beneath an extruder or doctor blade having a blade with a lower surface inclining upwardly from the panel at a small acute angle in a direction opposite to the direction of motion of the panel. The extruder blade is pressed firmly against the panel and accumulates beneath the lower surface thereof a supply or puddle of liquid resin. Resin passing beneath the extruder forms a layer across the entire surface of the panel. The motion of the panel beneath the extruder causes the resin to be drawn into the cracks, fissures and knot holes as the panel moves beneath the lower edge of the extruder so that the bottom portion resin layer fills such openings and conforms to the surface of the panel.

The panel is then moved through an oven which applies heat only to the upper, coated surface of the panel. As the panel moves through this oven, the wood acts as a heat sink cooling the portion of the resin layer nearest the wood and causing that portion to solidify. Sufficient heat is applied to cause the surface portion of the layer to remain liquid upon leaving the oven. The panel is next passed beneath a suitable smoothing device such as a nip roll which applies a sheet of paper to the liquid surface portion, a doctor blade or a wiping roll. Since the panel imperfections, knot holes, fissures and the like are now filled with the solidified resin of the lower portion of the resin layer, this smoothing step removes any resin in excess of the amount necessary to provide a resin layer of the desired thickness in the finished panel. Following the smoothing step, the surface portion of the resin layer is permitted to solidify whereupon the panel is ready for use in concrete forming or wherever a smooth surfaced or weather resistant panel is required. Additional coatings may be applied depending upon the intended use of the panel. A preferred resin is a mixture of polyamide resins which provide a tough, water and oil resistant coating on the panel enabling it to be utilized as exterior paneling or for repeated applications in concrete forms.

DRAWINGS

DESCRIPTION OF THE PREFERRED EMBODIMENT

Figure 1:
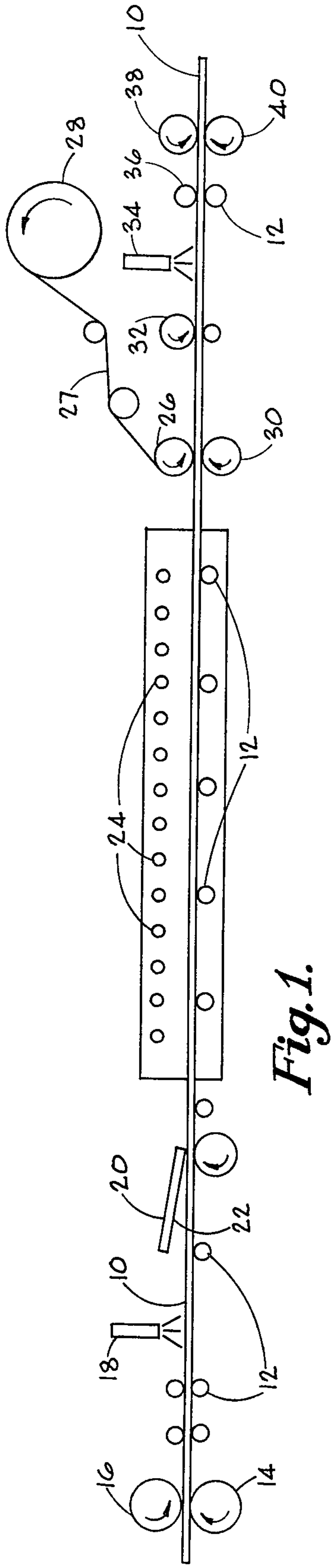
FIG. 1 is a schematic side elevation of apparatus constructed in accordance with the invention.

In accordance with the embodiment of the invention illustrated in FIG. 1, plywood panels 10 are fed along a horizontal path which may be defined by suitable conveyor means, such as a plurality of horizontally disposed rollers 12. The panels are preferably fed with the trailing and leading edges of succeeding panels in contact. In accordance with the invention panels of low grade such as those that have C-D surface veneers may be utilized. The panels are moved along their path by suitable feed means such as a pair of feed rolls including a lower feed roll 14 and an upper feed roll 16, driven in the direction shown by the arrows. The upper feed roll 16 presses upon the panel to assure that it is completely flattened across its width. Immediately following the feed rolls 14, 16 is a resin applicator 18 adapted to supply thermoplastic resin to the surface of a panel as it passes beneath. In this preferred embodiment 125–175 pounds of resin is applied per 1000 square feet of panel surface. Thereafter the panel 10 is passed beneath an extruder or doctor blade comprising a blade member 20 which is resiliently biased against the upper surface of the panel 10 passing therebeneath. The lower surface 22 of the blade 20 has a dimension in the direction of travel which is sufficient so that the bead of resin which forms behind the blade 20 is contained by its lower surface 22. In this preferred embodiment the dimension is between ten and twelve inches. The blade member 20 is inclined so that the lower surface 22 defines a small acute angle of between about 5 and 25° with respect to the upper surface of the panel depending on the composition and temperature of the resin and upon the size of the bead to be contained behind the blade member 20. Panels leaving the extruder have a resin layer 23 of preferably 0.025 to 0.035 inches minimum thickness across the entire panel surface.

The panels are next passed beneath heating devices 24 which are maintained at a temperature sufficient to cause a surface portion of the resin layer to remain liquid and tacky while that portion of the resin layer nearest the wood cools and solidifies. The wood panels act as a heat sink and facilitate the cooling process. The liquid surface portion of the resin layer approximately extends to a predetermined depth within the resin layer. At this depth a boundary between substantially liquid and substantially solid resin exists. This boundary is approximately parallel to the plane of the panel surface and substantially smoother than the panel surface itself. The depth of the boundary is determined by the thickness and composition of the resin layer, the temperature and the retention time under the heating devices 24. Although the preferred resins require a heating device to maintain the upper portion of the layer liquid while the lower portion solidifies, thermoplastic resins with appropriate cooling characteristics may solidify in the proper fashion without the aid of such heating devices.

In the embodiment of FIG. 1, after the portion of the resin layer nearest the wood of panels 10 is solidified, the panels are passed from the heating devices 24 to a heated nip roll 26. The nip roll 26 applies a sheet of paper 27 from a paper storage roll 28 to the liquid surface portion of the resin layer. As the paper is applied, the panel is pinched between the nip roll 26 and a support roll 30 so that the nip roll acts as a doctor in removing the liquid resin from the solidified portion of the resin layer forming a bead or berm of liquid resin behind the nip roll 26. This bead assists in partial saturation of the paper which is preferably impregnated to a point about midway of its thickness. Excess liquid thermoplastic resin of the bead is allowed to flow over the edges of the panel and is collected for recycling by suitable means (not shown). In the preferred embodiment, a layer of resin about 0.003 to 0.005 inches thick exists between the surface level of the panel 10 and the paper 27 after the panel has passed beneath the nip roll 26. The layer is, of course, thicker over defects in the panel surface.

The amount of resin in the final layer depends upon the condition of the surface being coated. With a relatively smooth, defect free surface much less resin is required than where a panel has numerous surface defects. With C-grade surfaces an average final resin layer contains between 15 and 25 pounds of resin per 1000 square feet of panel.

Any type of paper may be affixed to the resin layer. Because they resist impregnation, some highly finished paper surfaces will not adhere as well to the tacky resin layer as papers which have a rough surface. If panels are to be used in concrete forming, a natural grade kraft paper is preferred. If the panel is to be used for wall paneling or siding, a decorative paper may be applied. Under certain circumstances a resin impregnated paper will adhere especially well to the surface of the resin layer. If paper of greater width than the panel is used, the paper overhanging the side edges of the panels can be folded flat against the side edges thereby protecting and smoothing the edges. The end edges of the panels can be coated with paint to provide further protection.

Depending on the intended use of the panels, they may optionally be passed beneath a hold down roll 32 and the paper layer impregnated with a coating agent distributed by an applicator 34. If the panels are to be used in concrete forming, this coating agent could be a release agent. A paraffin, such as "165 Paraffin" produced by the Union Oil Co., is an especially suitable coating agent for use on concrete forming panels produced by this process. Materials such as lactates, buterates, acetates, phenolics, polyesters and paint are coating agents suitable for panels which are to be used in other applications. After the coating agent is deposited, the panels are passed beneath a pressured wiping roll 36 which spreads the coating agent and then between fulcrum rolls 38, 40 beyond which the panels are unsupported. Since the panels are unsupported beyond this point, each panel begins to tilt downwardly as it is fed outwardly eventually causing a clean snapping or breaking effect of the paper layer between adjacent panels on the line. Thereafter the panels 10 are discharged from the conveyor in finished condition.

Figure 2:
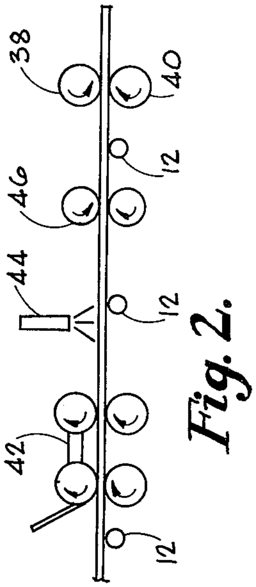
FIG. 2 is a schematic side elevation showing an alternate apparatus to perform the smoothing steps of the present invention.

An alternative method of treating the panels 10 having a resin layer with a cool solid lower portion and a liquid tacky upper portion is shown in FIG. 2. In this embodiment a sheet of paper is not applied to the resin layer. Instead, as panels emerge from beneath the heating devices 24, they pass beneath a smoothing device 42, such as a reverse wiping roll or doctor blade which removes the liquid portion of the resin layer down to about the depth of the liquid-solid boundary thereby forming a smooth continuous layer of resin. Excess liquid resin flows over the sides of the panels. A liquid coating agent, slurry or paint is then, optionally, deposited directly on the tacky surface of the resin layer by an applicator 44. Suitable coating agents include water based asbestos or calcium carbonate. The coated panels are passed beneath a wiping roll 46 which spreads the coating agent evenly over the entire surface of the panel and then between fulcrum rolls 38, 40 which function as previously described.

The resin used in all the preferred embodiments of this invention is a thermoplastic resin which is a solid at room temperature but which melts at some elevated temperature. Thermosetting resins are unsuitable since they react and become solid with the application of heat. Thermosetting resins would behave the opposite of thermoplastic resins in the applicants' apparatus, the top of the resin layer solidifying first instead of the bottom. Panels with a layer of thermosetting resin would emerge from the oven with an unworkable solid surface. Because thermoplastic resins may be remelted it is convenient to apply an excess of resin to the panel surface since any resin later removed from the panel surface may be saved and melted for reuse. Thermosetting resins do not allow this possibility. Any excess thermosetting resin is lost.

One preferred resin coating, when the panel is to be used for concrete forming, is a polyamide resin mixture which is tough and abrasion resistant. Polyamide resins are also alkali resistant, which is especially desirable if the panels are to be used as concrete forms. Moreover, polyamide resins are resistant to the common, oil-based bond breakers which are applied to the panels in order to assure easy separation of the panels from the poured, solidified concrete.

Desirable resins are those polyamides of carboxylic acids which are polymers of polyene fatty acids and their esters. Resins of ths general type are disclosed in U.S. Pat. No. 2,379,413. Typical of these polyamides are those made with polymerized polyene fatty acids and ethylene diamine, although other amines such as methyl amine, propylamine, cyclohexalmine, and dodecylamine can be used. The preferred resin is a mixture of a semi-solid reactive polyamide resin having an amine value of between 85 and 95 and being a semisolid having a Brookfied viscosity of between 7.0 and 12.0 poises at 150° C. with a thermoplastic polyamide resin having a softening point between one hundred five and one hundred fifteen degrees C. and a Brookfield viscosity of between 12 and 18 poises at one hundred sixty degrees C., and an amine number of about 4. A suitable and preferred semi-solid reactive resin of the type mentioned is sold under the tradename "Versamid 100" by General Mills, Inc. A suitable and preferred themoplastic resin of the type indicated is also sold by General Mills, Inc. under the tradename "Versamid 940 ." The preferred composition of these resins contains 10 weight percent reactive resin and 90 weight percent thermoplastic resin. A "pre-mixed" resin containing this desired blend of reactive resin and thermoplastic resin is sold under the tradename "Emereze 1556" by Emery Chemical Co.

The reactive resin serves as a non-migratory plasticizer for the thermoplastic resin. The thermoplastic resin identified has a sharp cooling curve which is an important factor in the ability of the resin to fill knot holes and large fissures or cracks in the surface of the panels being processed. By replacing part of the thermoplastic resin Versamid 940 with a rosin oil tackifier, such as with two percent of a tackifier sold under the name Actinil R-Toll Oil Rosin Type "S", a surface acceptable for painting, may be provided. The tackifier migrates to the surface and provides good paint adherence.

An additional resin composition which has proved to be suitable is a composition having about ninety weight percent thermoplastic polyamide resin, five weight percent paraffin, three weight percent of a vinyl acetate resin, and 2 weight percent tall oil rosin. "Versamide 940" is a suitable thermoplastic resin; "165 Paraffin" is a suitable paraffin; and "Elvax 150", produced by E. I. DuPont de Nemours & Co., Inc., is a suitable vinyl acetate resin. In this composition paraffin is included to increase the water resistance of the resin. The vinyl acetate improves flexibility and low temperature resistance. The tall oil rosin is a tackifier and also acts to lower the composition viscosity.

Depending upon the ultimate use of the panel other types of thermoplastic resins may be used which has a suitable cooling curve, i.e. one similar to that of the preferred polyamide resins. For example, some amorphous polypropylene resins may be used, as well as some polypropylene and polyethylene resins. Mixtures of tall oil resins and polypropylene may be used. Use of such mixtures requires, however, that panels be retained beneath heating devices 24 for longer periods than panels coated with a polyamide resin. Polypropylene mixtures are less expensive than polyamides and thus are the preferred resin when a water base release agent or paint is the coating agent to be applied. The tackiness of the polypropylene surface allows excellent adherence even directly between the resin and a coating agent. However, oil base release agents soften polypropylene resins and are thus unsuitable for use with such resins.

A desirable feature of the preferred thermoplastic resins is that they have a degree of flexibility at normal temperatures whereby the coating will flex as the panel flexes under load or as it swells or shrinks as its moisture contact changes thus minimizing the possibility of separation or delamination of the coating from the panel.

Figure 3:
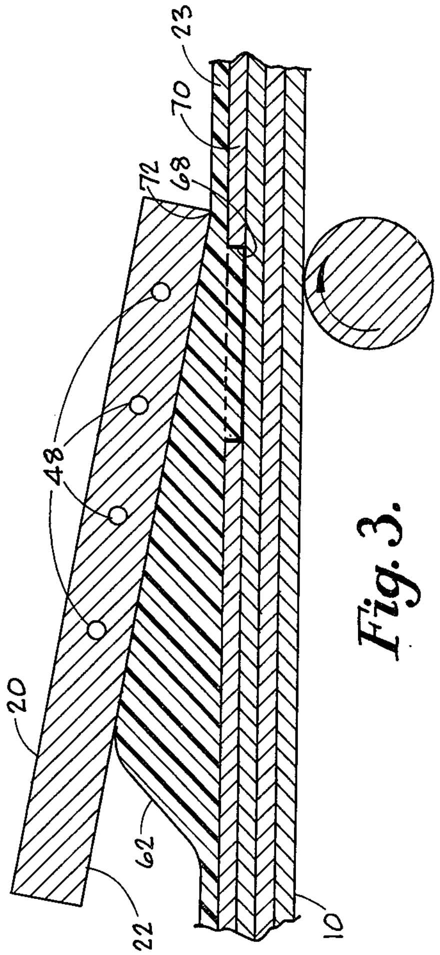
FIG. 3 is an enlarged fragmentary front view of an arrangement of the extruder in accordance with the invention.

Referring to FIG. 3, the lower surface 22 of the extruder or doctor blade 20 preferably has a width in the direction of travel of between about ten and twelve inches. The blade 20 is mounted so that the angle of inclination of the lower surface 22 with respect to the panels 10 may be adjusted. The lower surface 22 is preferably positioned so that it is inclined between an angle of about five and fifteen degrees with respect to the top surface of a panel 10. The blade 20 is biased downwardly by suitable means (not shown) toward the path of travel of the panels 10. A pressure of about 125 to 150 pounds has been found to be effective depending upon the resin viscosity. The blade 20 is preferably suitably heated such as by electrical heating elements indicated at 48 extending through the same.

As a panel moves beneath the blade 20 a puddle or bead of resin 62 builds up between the lower blade surface 22 and the upper surface of the panel. The bead is contained at the side edges of the panel to prevent the resin from flowing over the edges. When a void, such as indicated at 68, in the top veneer 70 of a panel moves beneath the lower edge 72 of the lower surface 22, the aperture presented beneath the edge 72 permits escape of resin beneath such edge. The forward movement of the panel 10 causes resin to be drawn beneath such edge whereby the void 68 is filled and the layer 23 of resin is spread evenly over the entire surface of the veneer. The rate of application of resin is adjusted so as to maintain an adequate bead 62, i.e., 6 to 8 inches in length in the direction of panel movement. This may be done manually or with automatic means responding to a suitable sensor responsive to the bead size. When numerous knot holes or defects are present the resin feed rate must be increased to maintain an adequate puddle as compared to what is required when few defects are present.

The angle of inclination of the doctor blade is related to the panel feed speed and resin viscosity. The faster the speed, the smaller the angle of the surface 22 with the panel surface. For example, at a panel speed of thirty feet per minute, and a lower surface 22 inclined so as to define an enclosed angle of fifteen degrees with a panel, the desired spread of the resin was obtained. With a panel speed of 100 feet per minute it would be necessary to reduce the angle to about eight degrees. The most desirable angle will, of course, also depend on other factors such as resin viscosity and the surface texture of the panels being processed. Some routine trial and error experimentation will have to be utilized to find the best angle.

The applicator 18 should have such proximity to the extruder blade 20 and the applied resin have such temperature that the resin will still be in liquid condition as the panel carries the applied resin beneath the blade 20. The spacing between the applicator and the extruder or doctor blade 20 will depend upon the resin characteristics and the ambient conditions under which the processing is carried out. With a resin mixture such as "Emereze 1536", a resin applicaton temperature of about three hundred degrees F. is found to be desirable with a spacing of about twelve inches between the applicator 18 and the extruder 20. The heating elements of the extruder are preferably adjusted to maintain the resin at a temperature slightly above its softening point so that it has a consistency of thick honey.

The temperatures of the heating devices 24 should be adjusted in accordance with the speed of processing of the panels to maintain the surface layer of resin at melting temperature. During the process panels must spend a sufficient length of time under the heating devices 24 to allow the portion of the resin layer nearest the wood to solidify. At a panel feed speed of 30 feet per minute, a 6½ foot long infrared heater adjusted to maintain the surface of resin at a temperature above the softening point has been found to be suitable for panels with a layer of "Emereze 1556." The softening point of this resin is about 275° F.

Figure 4:
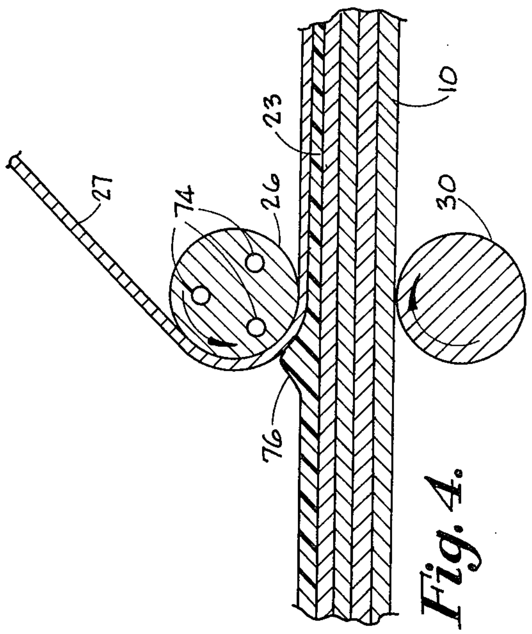
FIG. 4 is an enlarged fragmentary view of the nip rolls used in the smoothing apparatus of FIG. 1.

The nip roll 26 of FIG. 1 is preferably a smooth surfaced steel roll maintained at an elevated temperature (about 325° F.) by heating elements 74 therein. An enlarged view of a preferred nip roll appears in FIG. 4. The nip roll 26 is preferably biased by any suitable means against the top of the panel 10, the degree of tension being adjusted so that with a nip roll diameter of 3¾ inches, a bead 76 of molten resin of about one-eighth to one-half inch in diameter is maintained at the front of the roll on the surface of the panel. When operating at the preferred conditions described above, a total pressure of 175 to 225 pounds is suitable. Since the resin located in the defects of the panel has substantially solidified at this point, the nip roll 26 smooths the liquid surface of the resin layer 23 without overfilling the defects and without leaving bulging resin deposits over such defects.

No containment is made of the resin bead 76 at the side edges of the panels. Resin is permitted to flow outwardly and over the sides of the panel. By using paper 27 of excess width, the sides of the panel may be sealed by folding the overhanging paper against the resin coated side edges of the panels. The large quantities of thermoplastic resin which flows over the sides of the panels is collected, remelted and returned to the applicator 18 where it is applied to another panel.

EXAMPLE I

A plywood panel having a "C" surface was conveyed through equipment of the type illustrated in FIG. 1 at a rate of 30 feet per minute. A layer of polyamide resin mixture comprising ten weight per cent "Versamid 100" and ninety weight percent "Versamid 940" was applied to the C surface of the panel at the rate of abut 125 pounds per thousand square feet of panel. The resin temperature was 300° F. at the time of application. The panel was then passed beneath an extruder blade having a lower surface with a width in the direction of travel of 10 inches and inclined at an angle of 12.5° with respect to the upper surface of the panel. The extruder was resiliently biased against the upper surface of the panel at a pressure of 125 pounds. At this point a resin pool formed behind the extruder blade. This pool was maintained at about 275° F. by heating the extruder to 325° F. The panel emerged from the extruder with a resin layer averaging about 0.025 inches thick over the unblemished areas of the top veneer. Immediately after leaving the extruder, the panel was passed through an oven 6½ feet in overall length, having heating elements which applied heat only to the top side of panels passing therethrough. As it moved through the oven, the surface temperature of the resin layer increased from 250° F. at the inlet of the oven to 450° F. at the outlet as measured by a surface pyrometer. During passage through the oven, the wood of the panel acted as a heat sink allowing a portion of the resin nearest the wood to cool and solidify while a surface portion of the resin remained liquid and an intermediate portion remained in a semi-solid state. The panel was next passed beneath a nip roll which was heated to a temperature of 325° F. The nip roll, having a down pressure of 200 pounds, applied a sheet of forty pound natural grade kraft paper to the still liquid, tacky surface portion of the resin layer. As the panel passed beneath the nip roll the liquid portion and a part of the semi-solid portion of the resin layer was restrained and formed a bead or berm behind the heated nip roll. Some of the liquid resin was absorbed by the kraft paper. Excess liquid resin was allowed to flow over the edge of the panel. The nip roll also effected smoothing of the resin layer. After the panel emerged from the nip roll the layer of resin between the surface of the top veneer and the paper was about 0.003 inches thick. The panel with kraft paper laminated thereto was passed beneath a hold down roll and then an applicator which applied a sufficient supply of an oil based release coating to thoroughly saturate the paper. The panel was passed beneath a final hold down roll which wiped off excess coating agent and then between fulcrum rolls where the panel's own weight caused it to break cleanly from the succeeding panel on the line. The resulting panel was quite suitable for use in concrete forming.

EXAMPLE II

Plywood panels having a "C" surface were conveyed at 50 feet per minute through apparatus as illustrated in FIG. 1 modified as shown in FIG. 2. A layer of a polypropylene mixture comprising 33 weight percent polypropylene and 67 weight percent tall oil rosins was applied at 275° F. at a rate of about one hundred pounds per thousand square feet. The panels were passed beneath an extruder with a lower surface having a width in the direction of travel of 10 inches and inclined at an angle of about 12.5° with respect to the panel surface. After passing beneath the extruder the panels were passed through an over 6 feet in overall length so that the surface temperature of the resin layer increased from 200° F. at the oven inlet to 400° F. at the outlet as measured by a surface pyrometer. Upon leaving the oven, the panels were passed beneath a reverse wiping roll heated to about 300° F. and having a downward pressure of about 200 pounds. The wiping roll removed the liquid and a portion of the semi-solid surface coating thereby forming finished panels with a smooth continuous resin coating having an average thickness of about 3-5 mils. Knot holes up to 8 inches in diameter were completely filled with resin as were splits up to 4 inches in width running the length of the panels. A water based slurry of calcium carbonate was applied to the smooth resin coating and was spread evenly across the resin surface by wiping rolls. The panel was then passed through fulcrum rolls as previously described. The resulting panel was especially suitable for use as an underlayment panel.

EXAMPLE III

Panels were prepared as described in Example I except that liquid "165 Paraffin" was applied to the kraft paper instead of an oil based release coating. The resulting panels were excellent for use in concrete forming.

Thus the instant invention provides a means for upgrading plywood and like panels of low grade. Having illustrated a preferred embodiment of the invention it will be apparent that it permits of modificaton in arrangement and detail.

I claim:

1. A process for the upgrading the surface of a panel of cellulosic material having surface irregularities or defects which comprise the steps of:
   - feeding such a panel along a horizontal path;
   - applying a thermoplastic resin to the upper surface of said panel while maintaining said thermoplastic resin at a temperature above its melting point so that said resin remains liquid;
   - passing said panel beneath a doctor blade so that said liquid resin is spread across said upper surface to fill holes, cracks and fissures in said upper surface and form a resin layer completely across such surface;
   - maintaining the upper portion of the resin layer at a temperature sufficient to maintain such portion in a liquid, tacky condition while permitting the lower portion of the layer to cool and solidify;
   - forming a smooth upper surface on said upper portion; and
   - thereafter causing said upper portion to solidify.

2. The process of claim 1 wherein said resin comprises a mixture by weight of about 90 percent of a polyamide resinous material having a softening point between 105° and 115° C., a Brookfield viscosity of between 12 and 18 poises at 160° C. and about 10 percent of a reactive polyamide resin having a softening point at about 48° C. a viscosity of between 7 to 12 poises at 150° C. and an amine value of between 85 and 95, said mixture having a softening point of about 107° C.

3. The process of claim 1 wherein said resin is applied at a rate of 125–175 pounds per thousand square feet of panel surface.

4. The process of claim 1 wherein said doctor blade comprises a blade having a lower edge pressurably engaging said panel and a lower surface inclined at a small acute angle with the surface of said panel upwardly from said edge in the direction opposite to the directon of movement of said panel whereby a supply of liquid resin will be maintained between said panel and said lower surface to fill holes, cracks, and fissures in the panel.

5. The process of claim 4 wherein said blade is resiliently biased against said base.

6. The process of claim 4 wherein said acute angle is between 5° and 15°.

7. The process of claim 1 wherein said panels are fed at a speed of about 30 to 60 feet per minute.

8. The process of claim 1 wherein the step of forming a smooth upper surface comprises:
   - applying a sheet of paper to the upper surface of said layer; and
   - passing the panel and said sheet of paper beneath a nip roll to distribute and smooth said unsolidified resin upper portion.

9. The process of claim 8 which further comprises saturating said paper with a coating agent.

10. The process of claim 9 wherein said coating agent comprising paraffin.

11. The process of claim 9 wherein said coating agent comprising an oil based release coating.

12. The process of claim 9 wherein said paper comprises kraft paper.

13. The process of claim 9 wherein said paper comprises a resin impregnated paper.

14. The process of claim 1 wherein said step of forming a smooth upper surface comprises:
   - while said resin upper portion is still liquid, passing said panel beneath a doctor blade to smooth the surface of said upper portion.

15. The process according to claim 14 which further comprises coating the smoothed surface portion with a coating agent.

16. The process of claim 1 wherein said step of forming a smooth upper surface comprises :
   - while said upper portion of said resin layer is still liquid, passing said panel beneath a wiping roll to smooth the surface of said upper portion.

17. The process according to claim 16 which further comprises coating the smoothed surface with a coating agent.

18. A process for coating the surface of a panel of cellulosic material which comprise the steps of:
   - feeding such a panel along a horizontal path;
   - applying a thermoplastic resin to the upper surface of said panel while maintaining said thermoplastic resin at a temperature above its melting point so that said resin remains liquid;
   - passing said panel beneath a doctor blade so that said liquid resin is spread across said upper surface and forms a resin layer completely across such surface;
   - maintaining the upper portion of the resin layer at a temperature sufficient to maintain such portion in a liquid, tacky condition while permitting the lower portion of the layer to cool and solidify;
   - forming a smooth upper surface on said upper portion; and
   - thereafter causing said upper portion to solidify.

* * * * *